E. B. SMITH & A. V. MARSTON.
COOKING UTENSIL.
APPLICATION FILED APR. 10, 1911.
1,014,342.  Patented Jan. 9, 1912.
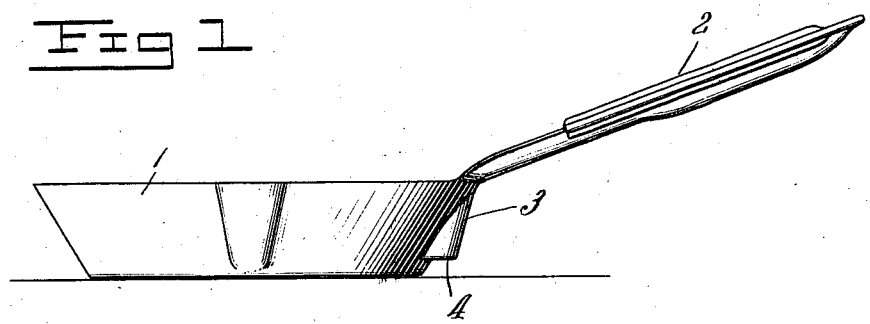
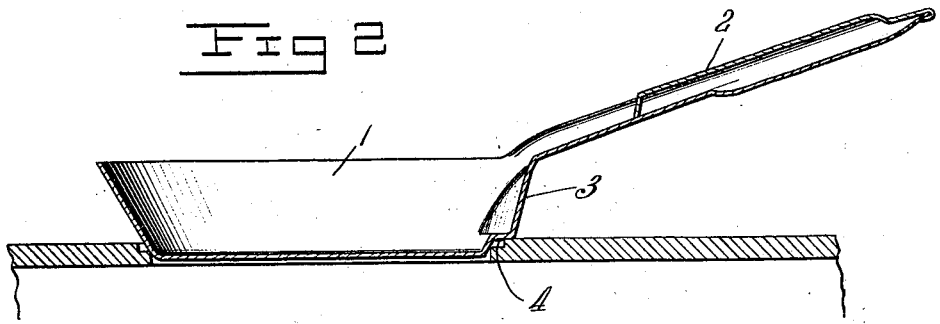
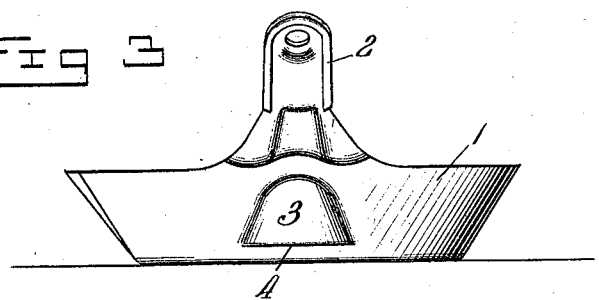
Inventor
Edward B. Smith
Annie V. Marston
Witnesses

UNITED STATES PATENT OFFICE.

EDWARD B. SMITH AND ANNIE V. MARSTON, OF EAST BRIDGEWATER, MASSACHUSETTS.

COOKING UTENSIL.

1,014,342.   Specification of Letters Patent.   Patented Jan. 9, 1912.

Application filed April 10, 1911. Serial No. 620,121.

*To all whom it may concern:*

Be it known that we, EDWARD B. SMITH and ANNIE V. MARSTON, citizens of the United States, residing at East Bridgewater, in the county of Plymouth and State of Massachusetts, have invented new and useful Improvements in Cooking Utensils, of which the following is a specification.

This invention relates to cooking utensils, and especially to the frying-pan type, having a shallow body provided with an extended handle; and has for its object to provide means to prevent the utensil from tilting and skidding in the stove hole because of the overbalancing weight of the handle.

The invention as herein disclosed comprises a utensil of not uncommon type, having a body-portion and a handle; an isolated portion of the material forming the body-portion or pan, directly below the handle, being bulged outwardly beyond the exterior of the body, so as to form a stud which acts as rest or support for the utensil when set in a stove hole.

One form of the invention is disclosed in the annexed drawings, in which:—

Figure 1 is a side elevation of a pan. Fig. 2 is a vertical section of the pan set in a stove hole, and Fig. 3 is a view of the pan showing the rest.

Having reference to the drawing in which similar characters indicate like parts, the utensil comprises a pan or body portion 1, of the usual type, having the handle 2 which, in utensils of this type, is commonly of such length and weight as that, if the pan be not supported firmly, it will overbalance and tilt the same. At a point intermediate the top and bottom of the inclined side of the pan or body-portion 1, and preferably directly below and in alinement with the handle 2, the material is bulged outwardly beyond the exterior of the same to form a rest 3 with a flat under surface or seat 4 which is near the bottom of the pan and parallel therewith, so that when the pan is set in the stove hole the flat parallel seat 4 will bear on the edge of the stove hole and hold the pan in horizontal position as will be clear from Fig. 2. The said rest 3 is in the form of an isolated stud and need not extend the full height of the inclined side of the pan 1, but occupies an intermediate position thereon, so that the seat 4 is not in the same plane as the bottom of the pan and does not interfere with the setting of the pan on a flat surface. The seat 4, since it is near the bottom of the pan and in a plane parallel thereto, insures a true horizontal position of the pan when set in the stove hole, because the flat seat takes the overbalancing weight of the handle 2, and thus prevents the pan from tilting or skidding in the stove hole. It will be observed that this struck-up portion is so arranged that there are no overhanging walls or ledges for lodgment of material or fouling of the utensil, and since it opens upwardly it may be readily cleaned after the utensil has been used.

It is obvious that in the manufacture of the pan the rest 3 with its seat 4 may be stamped out simultaneously with the formation of the body and without additional expense, so that the utensil, with the non-tilting feature, may be produced and sold to the consumer without extra cost.

We claim:—

1. A frying pan comprising a body-portion and a handle, said body-portion having an outwardly-bulged integral isolated stud below said handle to support the overbalancing weight of the handle and prevent skidding of the utensil when set in a stove hole.

2. A frying pan comprising a body-portion and a handle, an isolated stud or rest formed from the body of the pan and lying on the exterior of said body and below said handle, the lower face of said rest being flat and parallel with the bottom of said utensil to prevent the same from skidding and tilting under the weight of said handle when set in a stove hole.

3. A frying pan, comprising a body portion and a handle, said portion having an outwardly bulged integral stud or rest on its exterior below and in alinement with said handle, the lower face of said stud being flared and parallel with the bottom of the utensil, and the lateral wall thereof flaring upwardly and outwardly, substantially as shown and described.

In testimony whereof, we have hereunto set our hands in presence of two subscribing witnesses.

EDWARD B. SMITH.
ANNIE V. MARSTON.

Witnesses:
  SEWELL P. HOWARD,
  ARTHUR L. RICH.